United States Patent
Terada

(10) Patent No.: US 6,654,666 B1
(45) Date of Patent: Nov. 25, 2003

(54) PROGRAMMING METHOD AND APPARATUS FOR ROBOT MOVEMENT

(75) Inventor: Tomoyuki Terada, Oshino-mura (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 08/438,492

(22) Filed: May 10, 1995

(30) Foreign Application Priority Data

May 18, 1994 (JP) .............................. 6-127136

(51) Int. Cl.[7] .......................... G05B 15/00; G05B 19/04
(52) U.S. Cl. ...................................... 700/262; 700/250
(58) Field of Search ........................ 395/82, 92, 97, 395/80, 85; 901/3; 318/568.13; 700/262, 250

(56) References Cited

U.S. PATENT DOCUMENTS

| | | | | |
|---|---|---|---|---|
| 4,287,459 A | * | 9/1981 | Dahlstrom | 318/568 |
| 4,347,578 A | * | 8/1982 | Inaba | 364/513 |
| 4,385,570 A | * | 5/1983 | Yanagi | 112/121.12 |
| 4,543,639 A | * | 9/1985 | Inaba | 364/513 |
| 4,549,276 A | * | 10/1985 | Inaba | 364/513 |
| 4,595,989 A | * | 6/1986 | Yaukawa | 364/513 |
| 4,853,603 A | * | 8/1989 | Onoue | 318/568.15 |
| 4,891,763 A | * | 1/1990 | Kuriyama | 364/474.25 |
| 4,969,109 A | * | 11/1990 | Mizuno | 364/513 |
| 4,979,128 A | * | 12/1990 | Seki | 364/513 |
| 5,003,237 A | * | 3/1991 | Kimura | 318/568 |
| 5,057,995 A | * | 10/1991 | Mizuno | 364/192 |
| 5,079,491 A | * | 1/1992 | Nose | 318/568.11 |
| 5,113,338 A | * | 5/1992 | Seki | 364/191 |
| 5,177,420 A | * | 1/1993 | Wada | 318/568.11 |
| 5,184,051 A | * | 2/1993 | Schweiker | 318/568 |
| 5,204,942 A | * | 4/1993 | Otera | 395/83 |
| 5,300,868 A | * | 4/1994 | Watanabe | 318/568.13 |
| 5,315,222 A | * | 5/1994 | Kasagami | 318/568.11 |
| 5,327,057 A | * | 7/1994 | Kishi | 318/568.11 |
| 5,463,297 A | * | 10/1995 | Hara | 318/568.13 |
| 5,479,078 A | * | 12/1995 | Karakama et al. | 318/568.13 |
| 5,485,552 A | * | 1/1996 | Mizuno | 395/99 |
| 5,488,689 A | * | 1/1996 | Yamato et al. | 395/99 |

FOREIGN PATENT DOCUMENTS

| | | |
|---|---|---|
| JP | 58-050006 | 3/1983 |
| JP | 64-064016 | 3/1989 |
| JP | 5-108135 | 4/1993 |

* cited by examiner

*Primary Examiner*—George B. Davis
(74) *Attorney, Agent, or Firm*—Staas & Halsey LLP

(57) ABSTRACT

A robot movement programming method and apparatus for effectively creating a program for operating a robot with respect to workpieces of identical or similar shape. Sample programs for specifying sequence patterns suitable for the robot operations to be carried out are prepared, and also conversion formulas for obtaining teaching point position data are prepared as functions of dimensional parameters. The sample programs and the conversion formulas associated therewith are registered in a pattern library. The operator selects from the pattern library a sample program representing the sequence pattern suited for the robot operation to be carried out and designates the sample program as a base for creating a robot movement program after editing it, if necessary. Then, the operator inputs various parameter values, watching a graphic image of the sequence pattern specified by the selected sample program. A personal computer calculates necessary teaching point position data according to the conversion formulas and creates a robot movement program based on the calculated teaching point position data.

12 Claims, 5 Drawing Sheets

PROGRAMMING METHOD AND APPARATUS FOR ROBOT MOVEMENT

BACKGROUND OF THE INVENTION

1. Field of the Invention

This invention relates to a programming method for creating a program for a robot movement and a programming apparatus for carrying out the method, and more particularly to a programming method and apparatus for performing a robot operation on workpieces having a common shape and different dimension.

2. Description of the Related Art

Industrial robots have been widely used for automating and laborsaving in the manufacturing processes. A movement of an industrial robot, particularly, a predetermined path to be traced by the tip point of a tool held by the robot is, on many occasions, determined in accordance with the shape and dimension of a workpiece which is an object of the robot operation. The object of the robot operation is seldom limited to one kind of workpieces of the same shape and the same size. On many occasions, the robot operation of an identical or similar movement sequence is carried out on a plurality of kinds of workpieces having the same shape or common shape elements and different partly or entirely in dimension.

For workpieces having the same shape or common shape elements and different in dimension, it is conventional to create a whole program or a part of program relating to teaching position data. Consequently, time for teaching and programming operation increases to cause an obstruction in improving the efficiency of operation.

SUMMARY OF THE INVENTION

It is an object of this invention to improve the efficiency of teaching operation of a robot when workpieces as an object of the robot operation have a common shape and an operation sequence.

According to the present invention, there is provided a robot movement programming method comprising the steps of: creating at least one sample program for specifying sequence patterns of movement of the robot; defining parameters representing geometric quantities for the respective sequence patterns specified by the created sample program; defining conversion formulas for obtaining position data of teaching points for determining the movement path using the parameters; determining the sequence of the robot movement by selecting one from the created sequence patterns; determining values of the parameters in the conversion formulas defined for the selected sequence pattern; calculating the teaching point position data with respect to the determined movement sequence, by software means based on the conversion formulas and the parameter values; and obtaining a robot movement program based on the calculated teaching point position data.

Alternatively, in the above step of determining the robot movement sequence, at least one sequence pattern may be selected from the created sequence patterns and the robot sequence may be determined by editing the selected at least one sequence pattern.

Further, the above steps of calculating the teaching point position data and obtaining a robot movement program based on the calculated teaching point position data are carried out by a robot control device or an information processing device external of the robot control device.

The present invention also provides an apparatus for carrying out the above-mentioned programming method.

DETAILED DESCRIPTION OF THE PREFERRED EMBODIMENT

Figure 1:
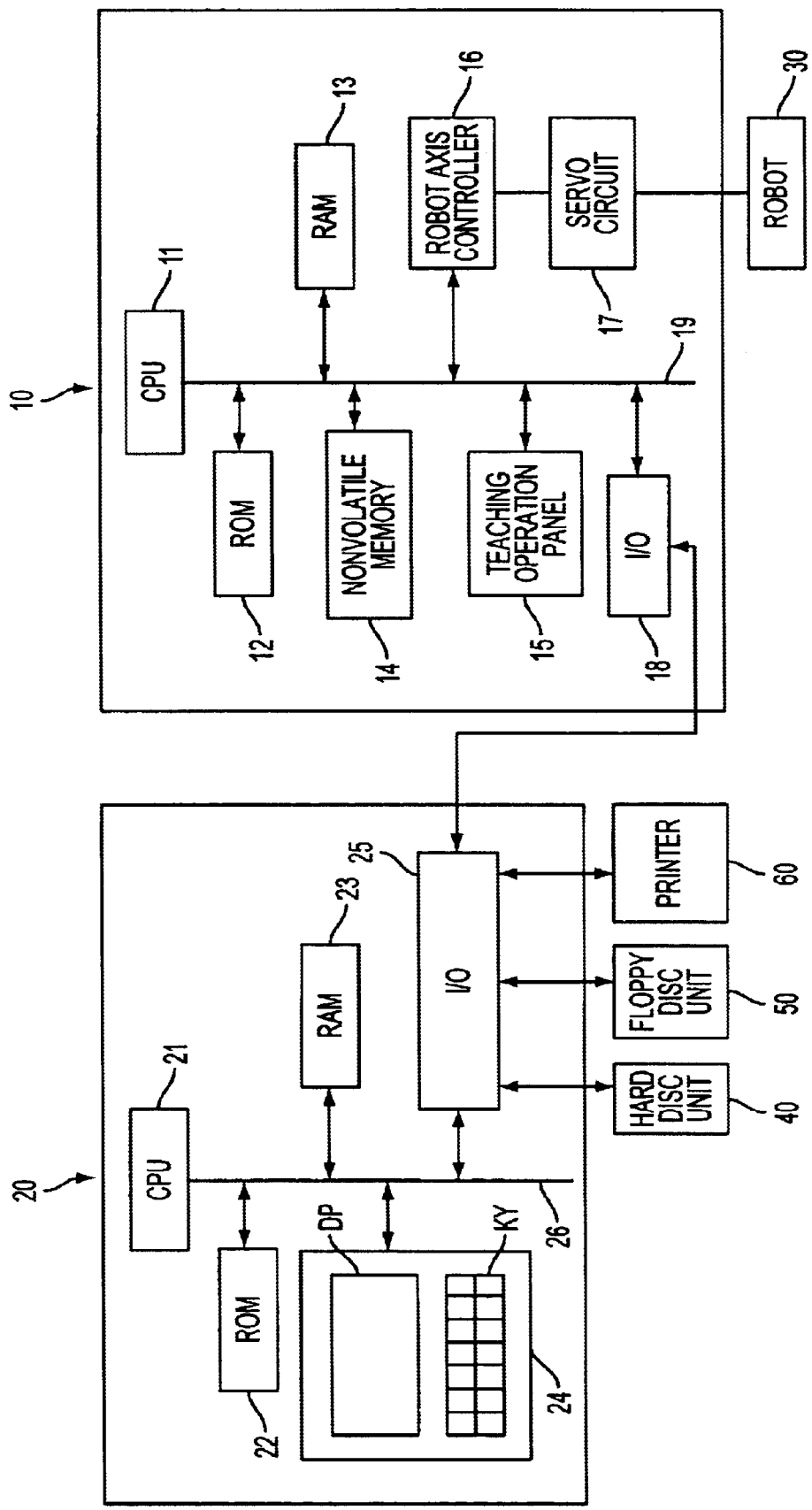
FIG. 1 is a block diagram of a control apparatus for carrying out the programming method of the present invention.

First, the principle of a programming method of the present invention will be described. The method of the present invention is accomplished in general by the following procedures or operations (1)–(6):

(1) Preparation of Sample Programs

A plurality of sample programs specifying robot movement sequence patterns are prepared. For this purpose, a robot is actually moved using one or more standard workpieces for the kinds of operations and the tip point of a tool held by the robot is positioned successively at a number of predetermined teaching points to obtain position data of the individual teaching points. Alternatively, the teaching point position data may be obtained based on design data of the workpiece and an operation plan by off-line programming. However, the teaching point position data at this stage is provisional data for obtaining a sequence pattern.

(2) Preparation of Conversion Formula for Obtaining Teaching Point Position Data For each sequence pattern specified by the individual sample program, a conversion formula for calculating the actual position data of each teaching point is prepared as a function which includes parameters representing geometric quantities (dimensions), such as length (distance), radius and angle.

For example, for a group of workpieces or operation lines identical or similar in shape but different in dimension, defining the lengths of sides (or ridgelines) of a workpiece or operating lines as a, b, c, . . . and the angle of a specific surface as θ, the conversion formulas for obtaining position data (X, Y, Z, W, P, R) at the individual teaching points are prepared as a function of these parameters. The above position data (X, Y, Z, W, P, R) includes data (X, Y, Z) for representing a position of the tool (tool center point) and data (W, P, R) for representing an orientation of the tool. These formulas are defined for the robot positions at the individual teaching points in accordance with the kind of the robot operation.

Program patterns, each including the sample program prepared in the procedure (1) and the conversion formula defined with respect to the sequence pattern specified by the sample program, are registered and stored in a pattern library in a suitable memory, such as a floppy disk or a hard disk.

Further, it is preferable to create, for every program pattern, a program for graphically displaying the relationship between the workpiece shape or operation lines and each parameter, and to register the created programs in the pattern library so that the operator can visually grasp which geometric quantity of the related workpiece shape or operation lines is represented by each parameter (a, b, c, f, etc.).

(3) Selection of Necessary Sequence Pattern for Robot Operation

Using the sequence patterns, necessary sequence for a robot operation to be carried out is determined. The determination of a sequence is made by selecting one from the prepared plural sequence patterns or by selecting some sequence patterns and combining them to create a single sequence.

(4) Determination of Value of Parameters Representing Geometric Quantities

The values of parameters in the conversion formula concerning the determined sequence are inputted. For example, the numeric values of a, b, c and θ in the foregoing example are inputted.

If the program patterns are registered and stored in the pattern library, the operator selects the necessary program pattern from the pattern library to order the display device to display the selected pattern on the screen and edits it (registering the edited program pattern as new one), and then the operator inputs the necessary parameter values.

(5) Obtaining Actual Teaching Point Position Data Using Conversion Formulas and Parameter Values Teaching point position data for determining a movement program are calculated based on the conversion formulas and the values of parameters representing geometric quantities. This calculation is performed by means of software loaded on an information processing device (a robot control device or an external information processing device). Since the calculation can be achieved basically by substituting variables in the above-mentioned formula, high performance and massive storage capacity are not required for the CPU of the control device.

(6) Obtaining Robot Movement Program

A robot movement program for performing a desired robot operation can be obtained based on the calculated teaching point position data.

Although the foregoing procedures and operations can be performed by an information processing device external of a robot control device, a part of such procedures and operations (particularly, calculating the teaching point position data based on the parameter values) may be performed by the robot control device. In the latter case, the results obtained by an external device is transferred to the robot control device in a suitable step and then the subsequent procedures are performed by the robot control device.

The programming apparatus for carried out the method of the invention will be described referring to FIG. 1.

In FIG. 1, the entire system comprises a robot 30, a robot control device 10 for controlling the robot 30, a personal computer 20 to be used as the programming device, and auxiliary equipments thereof, such as a hard disk unit 40, a floppy disk unit 50 and a printer 60.

The robot control device 10 has a micro processor (CPU) 11, which is connected with a ROM 12 for storing a control program for the robot control device, a RAM 13 used as a data memory or a temporary storage memory, a nonvolatile memory 14 for storing various set values and the robot movement program including teaching point position data, an teaching operation panel 15, an axis controller 16 connected to the robot 30 via a servo circuit 17, and an input-output (I/O) device 18 in the form of a universal signal interface, via a bus 19. Thus, the arrangement and function of the robot control device 10 are substantially the same as those of the conventional robot control device.

The personal computer 20 also is not required to have any special hardware arrangement which differs from that of the conventional personal computer. To the CPU 21 of the personal computer 20, a ROM 22 and a RAM 23 as internal memories, an operator control panel 24, which is equipped with a CRT or liquid crystal display DP and a keyboard KY, and an input-output (I/O) device 25 as a universal signal interface, are connected via a bus (including control, address and data bus lines) 26. The hard disk unit 40, the floppy disk unit 50, which serve as external memories, and the printer 60 are connected to the I/O device 25. The I/O devices 18 and 25 are connected with each other for transferring program data between the robot control device 10 and the personal computer 20.

Figure 2:
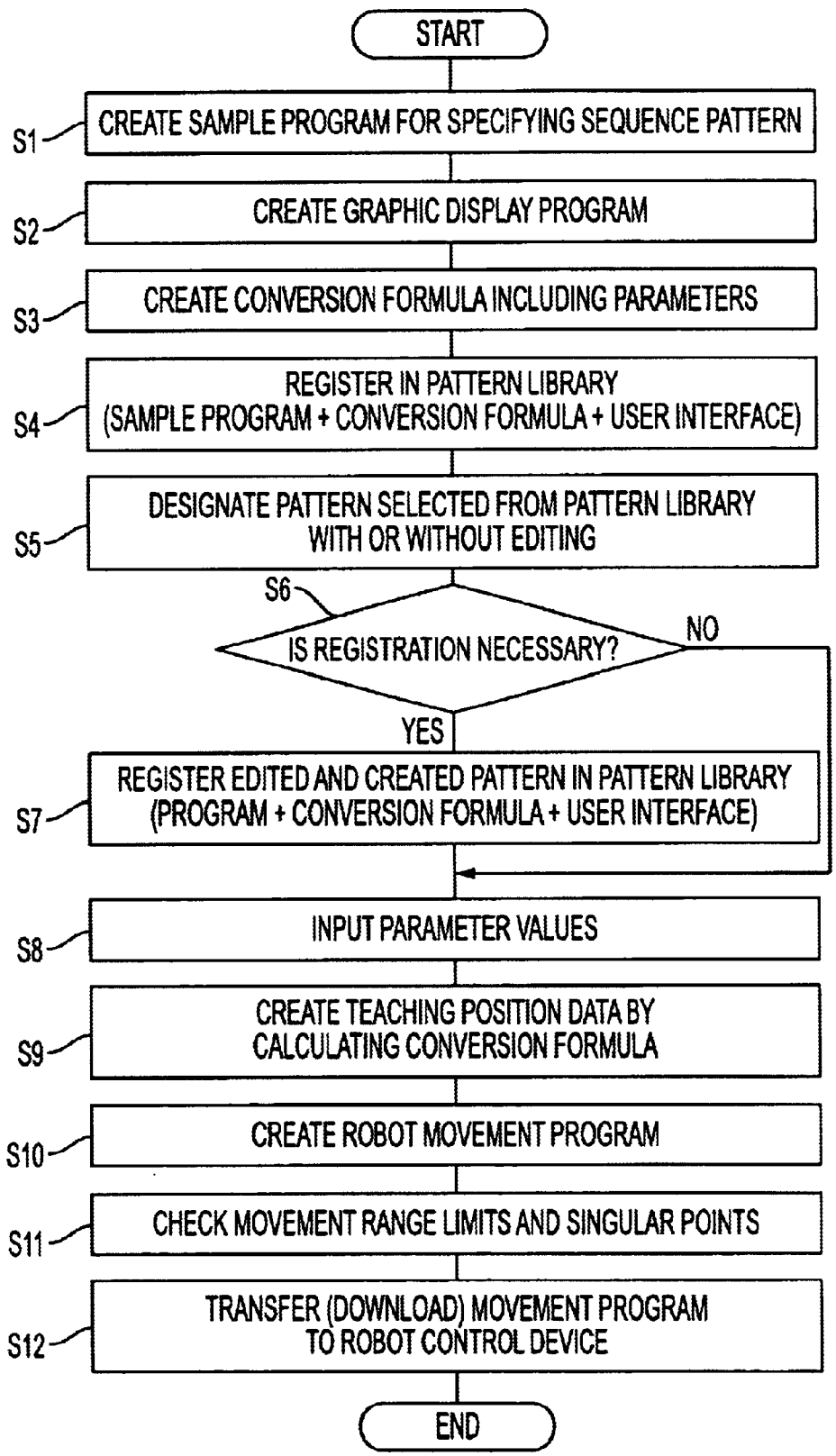
FIG. 2 is a flowchart showing processings to be carried out by a CPU of the programming device or a robot control device according to the method of the invention.

On the presumption that the system has the foregoing arrangement, the execution process according to the method of the invention will be described referring to the flowchart of FIG. 2. In FIGS. 3a–3f, reference numerals represent the corresponding step numbers as shown in the flowchart of FIG. 2.

In the memories 22 and 23 of the personal computer 20, all software and various set values (for creating a graphic menu, editing and registering a pattern library, invoking and displaying of an graphic image and related data from the pattern library, inputting and registering the conversion formulas with parameters representing geometric quantities, and calculation of the conversion formulas) are previously stored.

First, sample programs representing sequence patterns suitable for the individual robot operations are created (Step S1). For example, position data of the individual teaching points are obtained by the teaching/playback method using a standard workpiece and the robot 30, or by the off-line programming method based on design data of the workpiece and the operation plan. The teaching position data obtained at this stage is treated as provisional data.

Figure 3A:
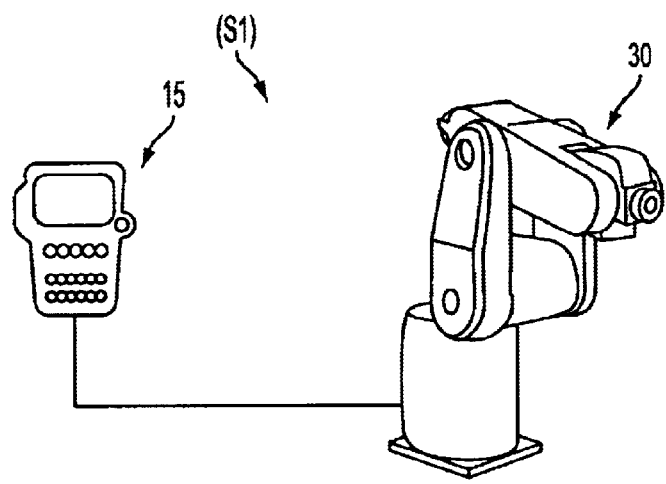
FIGS. 3a, 3b, 3c, 3d, 3e and 3f illustrate the processings to be carried out according to the method of the invention.
Figure 3B:
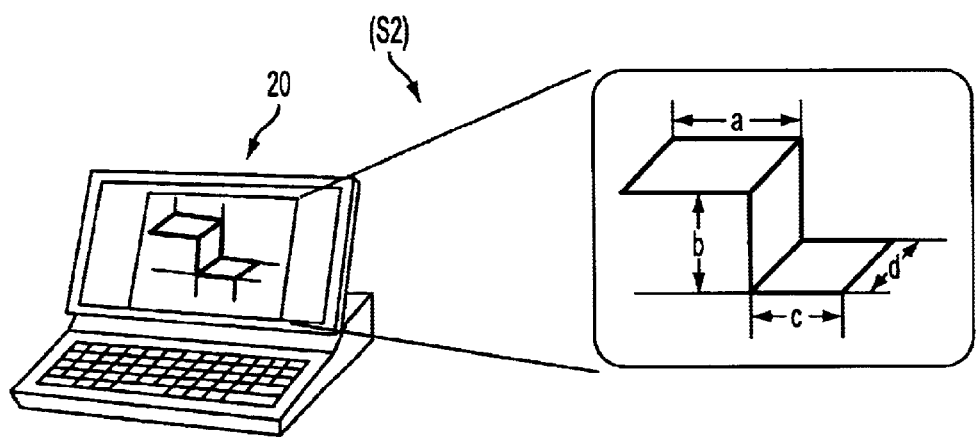

Then, using a graphic menu creating tool, a graphic display programs are created for the operator to input parameters representing dimensions of a workpiece or operation lines (Step S2). In FIG. 3b, the shape of the workpiece and the definition of the parameters to be inputted for the workpiece are graphically displayed on the liquid crystal display of the personal computer 20.

In this example, the lengths a–d of various ridgelines of the workpiece are designated as parameters. The selection of parameters are not limited to a single way but various way of selection can be adopted so that the individual teaching point positions can be expressed with the parameters by suitable conversion formulas.

Subsequently, conversion formulas are created for obtaining the teaching point position data needed for the robot to perform a bending operation using the parameters a–d (Step S3) in this embodiment. The conversion formulas take various forms depending on the way of selection of the parameters and the kind of the robot operation. Generally, the conversion formulas are preferably multi-term expressions of first or second degree, or expressions including a trigonometric function (particularly when the parameter represents an angle), which may be easily executed by the personal computer 20.

In the example as shown in FIG. 3b, the workpiece has a dimension of length (a+b+c) and width d. The workpiece is held by the robot and inserted into a vending machine with an angle 30°. The vending machine is positioned at a position (500, 0, 200) in the robot coordinate system. At the beginning of the bending operation, the robot position holding the workpiece is expressed by the following equations.

$$X = 500 - \cos 30° \times (a+b+c) = 500 - 0.86 \times (a+b+c)$$

$$Z = 200 + \sin 30° \times (a+b+c) = 200 + 0.5 \times (a+b+c)$$

Figure 3C:
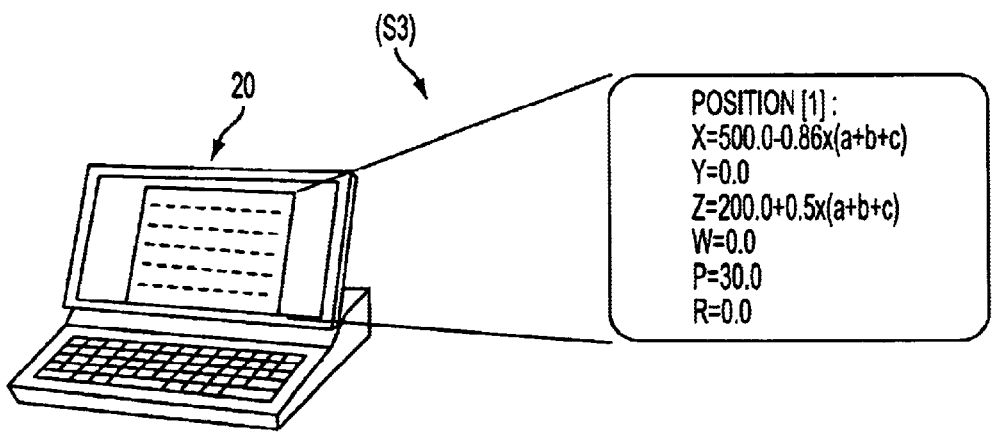
Figure 3D:
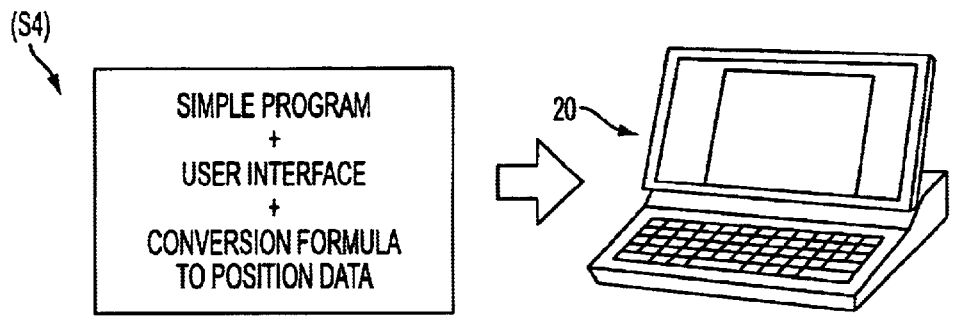
Figure 3E:
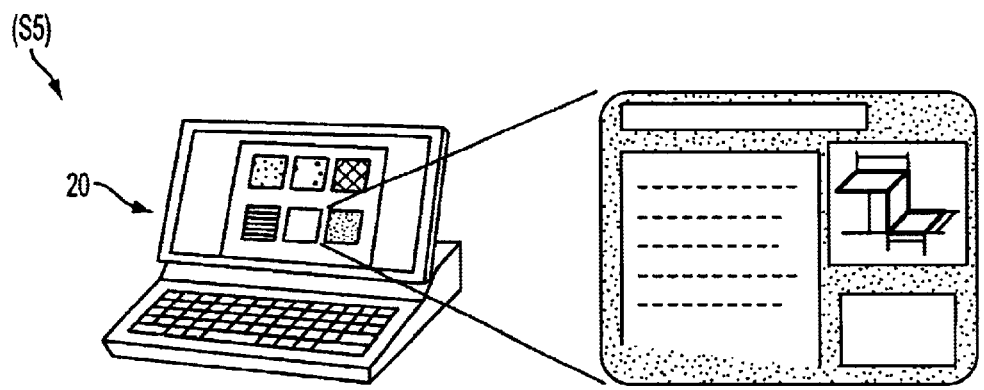

The above conversion formulas shown in FIG. 3c are merely illustrative examples.

In most cases, there are more than one teaching point necessary for determining a moving path of the robot, and the number of the conversion formulas depends on the number of the teaching points. For example, for calculating values of the individual components of position data (X, Y, Z, W, P, R) for determining the position and posture of the robot at five teaching points, it requires basically 5×6=30 formulas. However, if there are the components of constant, the substantial number of the formulas would be less.

The sequence patterns and related information graphically displayed are registered in the pattern library as program patterns (Step S4). The registered related information includes conversion formulas and code names (user interface). The memory area for reserving the pattern library is allocated to, for example, a hard disk in the hard disk unit 40 or a floppy disk in the floppy disk unit 50.

The foregoing procedures are regarded as a preliminary process for creating a desired robot movement program and if it is executed in advance by the service supplier, the end user's burden is reduced.

Then, when the end user executes a particular operation on the workpiece of a particular size, the user selects from the pattern library a sample program for specifying the desired sequence pattern suited for the particular operation, and then designates the selected sample program as a base for creating the movement program, after editing it if necessary (Step S5). If the sample program is edited, the edited sample program is additionally registered in the pattern library so that no further editing is needed for the following similar operations (Steps S6, S7). An example of the editing is described later.

Figure 3F:
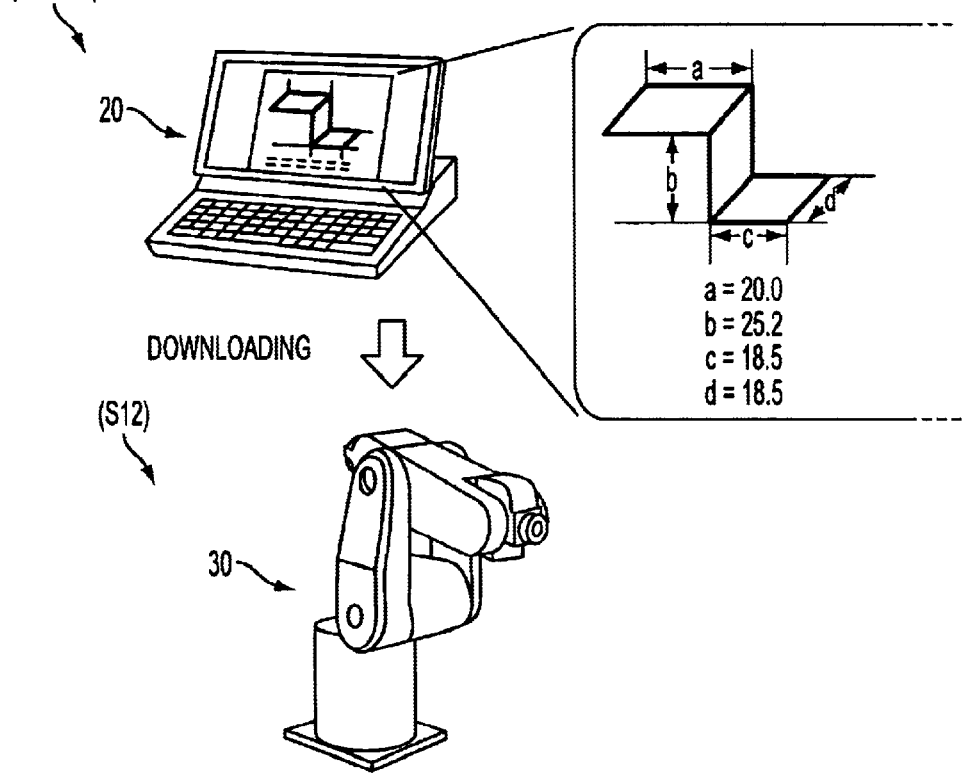

The operator inputs values of the individual parameters a–d, watching the screen (FIG. 3f) which displays the image of the sequence pattern according to the selected sample program and the parameter input image (Step S8). The numeric values as shown in FIG. 3f are merely illustrative examples.

Upon completion of inputting the numeric values of parameters, a conversion formula calculating program, stored in the ROM 12 of the personal computer 20, is invoked to the working area in the RAM 13 to start the conversion formula calculating program, so that the positions of the necessary teaching points are calculated according to the conversion formulas to obtain teaching point position data (Step S9).

Based on the obtained teaching point position data, a robot movement program is created according to the customary program creating process (Step S10).

The created program is transferred to the robot control device 10 (downloading, Step S12) after checking limits of the range of a robot movement and checking whether or not there are any singular points (unable to make inverse transformation), to terminate all process.

The movement program stored in the nonvolatile memory 14 of the robot control device 10 is started to execute a play-back operation, so that the robot operation suited for the particular workpiece whose dimension is designated by the parameters are properly carried out.

It is not necessary to execute the above-mentioned entire process using the external device (the personal computer 20 here) of the robot control device 10, and at least part of the process may be executed using the robot control device 10. In particular, it is practically advantageous to download the uncalculated conversion formulas, input the parameters from the teaching operation panel 15 and execute calculation of the conversion formulas with the CPU 11 of the robot control device 10.

The editing of the selected pattern and the additional registration of the edited pattern in the pattern library (Steps S5 through S7) will be described with reference to FIGS. 4–6. Assume here that, as shown in FIG. 6, a movement program for the movement sequence (O→Q→S→O→A→B→C→D→A) for a single workpiece, which is a combination of a fan shape O→Z→S→O and a rectangle A→B→C→D→A, is to be created.

Figure 4:
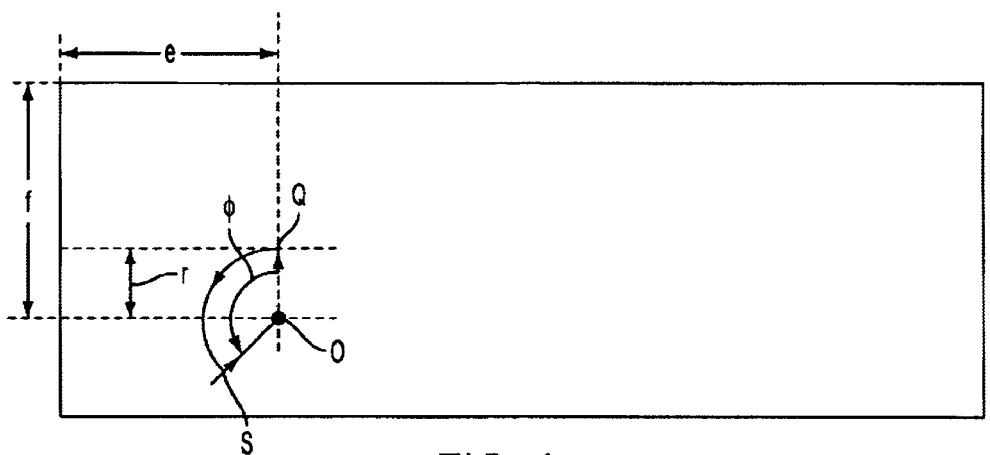
FIG. 4 is a diagram showing a fan-shape sequence pattern displayed on a display unit.
Figure 5:
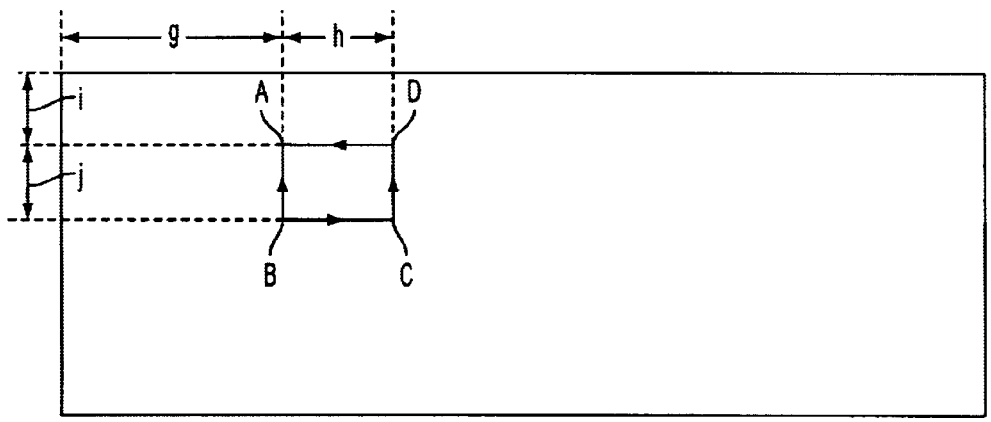
FIG. 5 is a diagram showing a rectangular sequence pattern displayed on a display unit.
Figure 6:
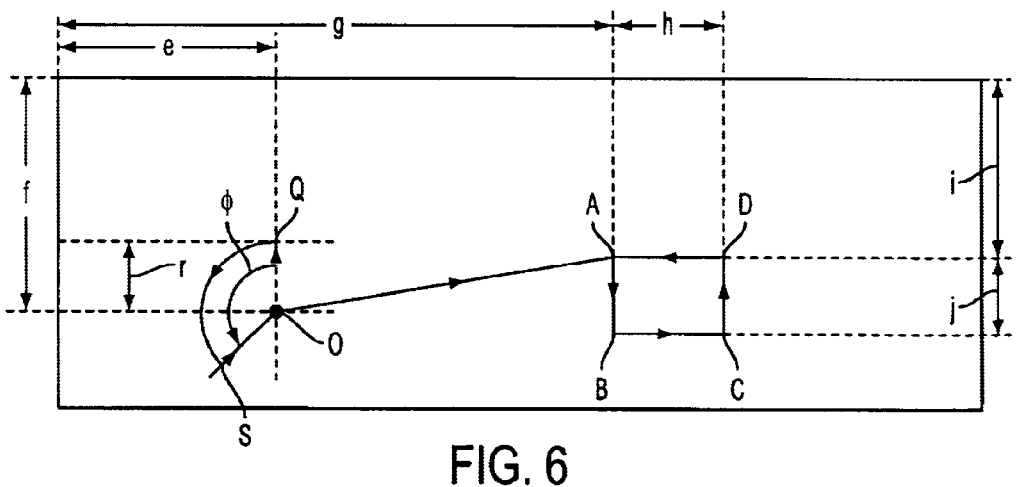
FIG. 6 is a diagram showing a movement sequence edited by combining the sequence patterns of FIGS. 4 and 5.

If there is not a sample program including the sequence shown in FIG. 6 in the pattern library, the fan-shape sequence pattern shown in FIG. 4 and the rectangular sequence pattern shown in FIG. 5 are graphically displayed on the screen, and the sequence of FIG. 6 is created by combining the fan-shape pattern and rectangular sequence pattern, and the program specifying the resulting sequence is registered as an additional sample program in the pattern library (FIG. 2; Steps S5–S7). When combining the two sequence patterns, a statement for the moving path 0→A is inserted.

In this embodiment, the number of parameters is eight (e–j, r and θ). The position and dimensions of the fan-shape operation line and the rectangular operation line are definitely described by determining respective values of the eight parameters and the teaching point position data for realizing the robot movement path of FIG. 6 on an appropriate coordinate system is calculated (FIG. 2, Steps S8 and S9).

Subsequently, according to the program creating process, the robot movement program is created (Step S10) and is downloaded in the robot control device 10 (Step S12) after making the limit check and the peculiar points check (Step S11), whereupon the operation and processing on the personal computer are terminated.

According to the present invention, the efficiency of the programming process (teaching process) of the movement program is improved when the workpieces have a common shape (generally, the shape of a part relating to the robot movement path) and a common movement sequence. For example, in a case where the movement program including the common movement sequence is to be created for plural kinds of workpieces having the same shape or common shape elements and different partly or entirely in dimensions, the desired movement program is obtained by the simple operations of selecting the sequence pattern and determining the values of parameters in the conversion formulas. Therefore, when the workpieces of similar shape increases, the burden of the operator for the entire teaching process is reduced.

What is claimed is:

1. A robot movement programming method for creating a program for moving a robot along a movement path using an information processing device, said method comprising:

creating at least one sample program for defining a plurality of sequence patterns of movement of the robot for at least one sample workpiece;

preparing conversion formulas as mathematical functions representing geometric figures for obtaining position data of teaching points of the at least one sample program, said conversion formulas including geometric quantities of said sample workpiece as dimension variables such that movement data for multiple workpieces with the same or common shapes but differing geometric dimensions can be determined by changing values of the dimension variables, to define a movement path for the sample workpiece;

registering the at least one sample program and conversion formulas for one of the plurality of sequence patterns in a pattern library;

changing dimension variable values in said conversion formula for the one sequence pattern for a new workpiece of the same or common shape but having different geometric dimensions;

calculating teaching point position data for the movement sequence determined by software means based on said conversion formula for the sequence pattern and said changed dimension variables for said new workpiece; and obtaining a robot movement program based on said calculated teaching point position data for said new workpiece.

2. A robot movement programming method according to claim 1, wherein said calculating of the teaching point position data for the one sequence pattern and the obtaining of the robot movement program are carried out by an information processing device external of a robot control device.

3. A robot movement programming method according to claim 1, wherein said calculating of the teaching point position data for the one sequence pattern and the obtaining of the robot movement program are carried out by a robot control device.

4. A robot movement programming method according to claim 1, further comprising performing a check of limits of a robot motion range or a check of singular points in the obtained robot movement program.

5. A robot movement programming method according to claim 1, wherein the creating of the at least one sample program further comprises assigning corresponding dimension variables the geometric quantities of the sample workpiece.

6. A robot movement programming method for creating a program for moving a robot along a movement path using an information processing device, said method comprising:

creating at least one sample program for defining a plurality of sequence patterns of movement of the robot for a sample workpiece;

preparing conversion formulas as mathematical functions representing geometric figures for obtaining position data of teaching points of the at least one sample program, said conversion formulas including geometric quantities of said sample workpiece as dimension variables such that movement data for multiple workpieces with the same or common shapes but differing geometric dimensions can be determined by changing values of the dimension variables, to define a movement path for the sample workpiece;

registering the at least one sample program and conversions formulas in a pattern library;

selecting at least one sequence pattern from said plurality of sequence patterns and determining a movement sequence of the robot comprising the selected at least one sequence pattern, combining the selected at least one sequence pattern to create a single sequence pattern if more than one of the sequence patterns is selected as the at least one sequence pattern, and registering the at least one sample program for said sample workpiece, the at least one sequence pattern, and any corresponding conversion formulas for the selected or single sequence pattern in the pattern library;

changing dimension variable values in said corresponding conversion formulas for a new workpiece of the same or common shape but having different geometric dimensions;

calculating teaching point position data for the determined movement sequence, determined by software means based on said corresponding conversion formulas and said changed dimension variables for said new workpiece; and obtaining a robot movement program based on said calculated teaching point position data for said new workpiece.

7. A robot movement programming method according to claim 6, wherein said calculating of the teaching point position data for the determined movement sequence pattern and the obtaining of the robot movement program are carried out by an information processing device external of a robot control device.

8. A robot movement programming method according to claim 6, wherein said calculating of the teaching point position data for the determined movement sequence pattern and the obtaining of the robot movement program are carried out by a robot control device.

9. A robot movement programming method according to claim 6, wherein the creating of the at least one sample program further comprises assigning corresponding dimension variables the geometric quantities of the sample workpiece.

10. A robot movement programming apparatus for creating a program for moving a robot along a movement path, comprising:

sample program storing means for storing at least one sample program defining a plurality of sequence patterns movement of the robot for a sample workpiece, wherein the at least one sample program includes conversion formulas as mathematical functions representing geometric figures for obtaining position data of teaching points, with the conversion formulas including geometric quantities of said sample workpiece as dimension variables such that movement data for multiple workpieces with the same or common shapes but differing geometric dimensions can be determined by changing values of the dimension variables, to define a movement path for the sample workpiece;

movement sequence storing means for storing a robot movement sequence comprising one of said at least one sequence pattern selected from the sequence patterns by an operator;

variable editing means for changing dimension variable values in any conversion formulas corresponding to the selected one sequence pattern, with the changed dimension variables being geometric dimensions for a new workpiece and input by the operator for the new workpiece, the new workpiece having the same or common shape but with different geometric dimensions;

calculating means for calculating teaching point position data with respect to the robot movement sequence, using the corresponding conversion formulas and the changed dimension variables for said new workpiece; and means for creating a robot movement program for said new workpiece based on the calculated teaching point position data.

11. A robot movement method for moving a robot along a movement path, based on a sample program including a conversion formula for obtaining position data of teaching points, with the conversion formula including geometric quantities of a sample workpiece as dimension variables such that movement path data for multiple workpieces with the same or common shapes but differing geometric dimensions can be determined by changing values of the dimension variables, comprising:

changing values of dimension variables of the conversion formula based on user entered geometric dimensions of a new workpiece;

calculating movement path data for the new workpiece based on said conversion formula and the changed dimension variable values; and programming the robot to operate along the calculated movement path.

12. A robot movement method according to claim 11, further comprising obtaining and storing a robot movement program based on the calculated movement path.

* * * * *